Sept. 19, 1967    F. K. FOX    3,343,080
PULSING GROUND FAULT DETECTOR APPARATUS
Filed Oct. 7, 1963

INVENTOR.
FRANCIS K. FOX
BY
John B. Sponsler

United States Patent Office 3,343,080
Patented Sept. 19, 1967

3,343,080
PULSING GROUND FAULT DETECTOR
APPARATUS
Francis K. Fox, Oakland, Calif., assignor to General
Electric Company, a corporation of New York
Filed Oct. 7, 1963, Ser. No. 314,384
1 Claim. (Cl. 324—52)

ABSTRACT OF THE DISCLOSURE

A ground fault detection apparatus including a grounded neutral Y-open delta transformer, the Y winding being applied across a three phase system and the open delta winding being connected across a tapped resistor. A timer is arranged to periodically short out a tapped portion of the resistor, thereby causing a pulsing of the three phase system in the event of a ground fault on any of its three lines. A gas triode detector circuit is also connected across the open delta winding for indicating when a fault occurs via a relay operated indicator lamp in the anode circuit of the gas triode. With this apparatus it is not necessary to remove the grounded neutral of the system being tested in order to locate a fault.

---

This invention relates to apparatus for locating ground faults in electrical power distribution systems, and more particularly, in multi-phase electrical distribution systems.

A feature of the invention is the grounding of the electrical system neutral line through a resistor combination using a Y-broken delta transformer, the resistor being connected across the broken delta secondary winding. A limitation in this arrangement is that the transformer and resistor combination have to be designed so that when a ground fault occurs on any phase the current supplied to the fault is equal to or greater than the capacitative charging current.

Another feature of the invention is the use of a pulsing arrangement for interrogating the ground fault through the novel resistor-transformer arrangement referred to above without removing the resistance ground from the system. This enables a more rapid and effective means of tracing and locating ground faults than with conventional arrangements.

The invention is set forth with particularity in the appended claim. The principles and characteristics of the invention, as well as other objects and advantages are revealed and discussed through the medium of the illustrative embodiments appearing in the specification and drawings which follow.

In the drawing FIGURE 1 is a diagrammatic view of the ground fault circuit.

Figure 1:
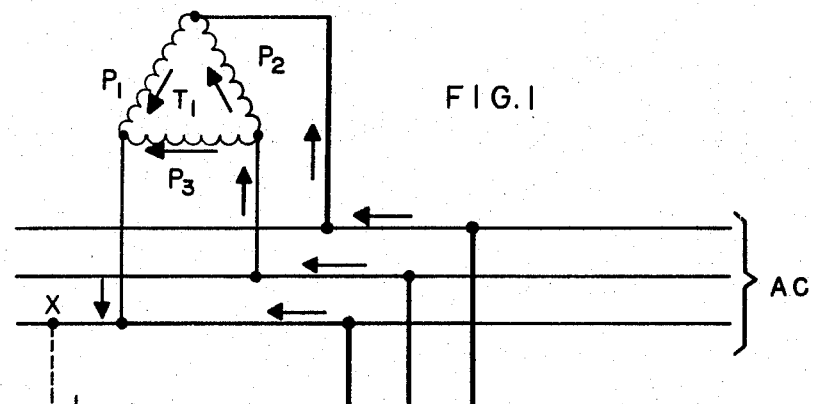

Referring now to FIGURE 1 a three phase distribution line AC is shown having a delta connected transformer T–1 delivering power therefrom to a load (not shown). A Y-delta transformer T–x, also connected to the line AC, provides the resistor-transformer component mentioned above along with the resistances R–1 and R–2.

The neutral of the Y winding of the transformer T–x is grounded through a current transformer to which a sensitive ammeter A may be connected, and the resistors R–1 and R–2, in series, are connected across the broken delta secondary winding of the transformer T–x, having the windings a, b and c.

The broken delta secondary comprising the windings a, b and c is also connected through a diode to a variable resistor R–v to a capacitor CC, which, in turn, feeds its output to the properly biased grid of a gas triode V, the resistor R–v and capacitor CC forming a variable time delay network therefor. The anode circuit of the gas triode V includes a relay winding R–L which coacts with a pair of n/o contacts CT to energize a lamp L. A switch S–1 is included in the power supply to the anode of the gas triode V to open the circuit to the lamp L and the relay winding R–L after a fault has been located.

Figure 2:
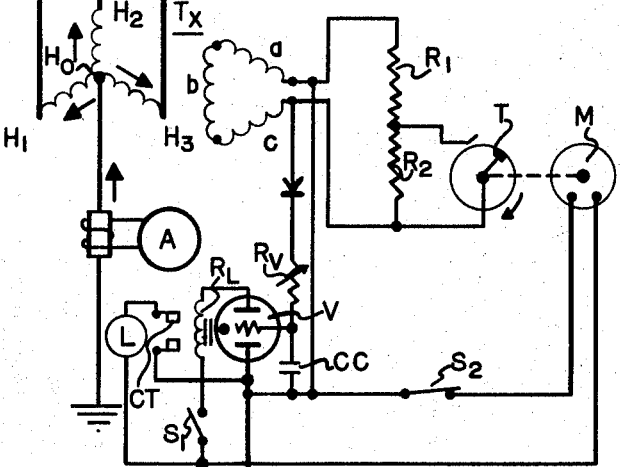
FIGURE 2 is a schematic view of part of the circuit of FIGURE 1 illustrating the normal condition of an electrical distribution system without a ground fault.
Figure 3:
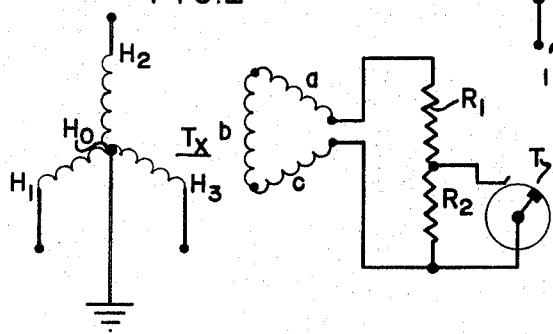
FIGURE 3 is a schematic view of the circuit represented by FIGURE 2 when a ground fault occurs.

The resistors R–1 and R–2 connected across the broken delta secondary winding, referring now to FIGURE 2, normally have no potential across them since the normal output of the secondary is zero, the voltages across the primary of transformer T–x, namely windings H–0 to H–1, H–0 to H–2 and H–0 to H–3 balancing each other. However, when a ground fault occurs, such as at "X" (see FIGURE 1) upon the phase corresponding to the winding H–0 to H–1, a potential is developed across the resistors R–1 and R–2 (see FIGURE 3) since the winding H–0 to H–1 is no longer effective in balancing the output of the transformer T–x. When this condition occurs the potential across resistors R–1 and R–2, after a time delay according to the setting of the variable resistor R–v, energizes the grid of the gas tube V and the relay winding R–L to energize via the contacts CT the lamp L, indicating that a ground fault has occurred (referring again to FIGURE 1). At the same time that the lamp L gives an alarm the sensitive ammeter A will indicate the existence of an abnormal systems condition.

In order to trace the ground fault, or other abnormal condition, without disrupting the circuit conditions such as might occur were the grounding connection of the primary of transformer T–x removed, referring to FIGURE 1, an arrangement is provided whereby the resistor R–2 is periodically short-circuited via a contactor or timer T driven by a motor M controlled by a switch S–2. In this manner the effect of the ground fault is modulated or pulsed thereby enabling an operator to more readily check the location of the fault via observation of these fluctuations in the sensitive ammeter A and a suitable portable current detecting device. Since the lamp L under control of the gas triode V becomes energized at the instance of the fault, the triode V remaining conductive until switch S–1 is opened, the pulsing of the timer T has no effect upon that indicating medium.

When there is already a neutral point existing in the system a single phase transformer may be connected to ground via its primary from the neutral point and the secondary connected across the resistors R–1 and R–2 in series as in FIGURE 1.

The present invention provides a simple and easily operative type of apparatus for detecting ground faults and similar abnormal conditions in an electrical system, and requires little or no disruption of the system.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is, therefore, contemplated by the appended claim to cover all such modifications as fall within the scope and spirit of the invention.

What is claimed is:

A ground fault detector for an electrical distribution system comprising a three phase transformer having a Y-connected primary winding and an open delta secondary winding, a current detecting device connected between the neutral of said Y-connected winding and ground, a pair of resistors connected in series across said open winding, means for sensing a potential across said resistors, indicating means controlled by said sensing means, and means for periodically shunting one of said pair of resistors.

References Cited

UNITED STATES PATENTS

| 2,400,749 | 5/1946 | Foster | 317—18 |
| 2,403,414 | 7/1946 | Traver | 317—18 X |
| 2,641,633 | 6/1953 | Hosford | 324—52 |
| 3,176,219 | 3/1965 | Behr | 324—51 |
| 3,230,424 | 1/1966 | Gagniere | 317—18 |
| 3,287,636 | 11/1966 | Gagniere | 317—18 X |

FOREIGN PATENTS

| 1,144,839 | 3/1963 | Germany. |
| 923,292 | 4/1963 | Great Britain. |
| 114,006 | 5/1945 | Sweden. |

MILTON O. HIRSHIELD, *Primary Examiner.*

W. L. CARLSON, *Examiner.*

G. R. STRECKER, R. V. LUPO, *Assistant Examiners.*